United States Patent
Roddy et al.

(10) Patent No.: US 6,762,785 B2
(45) Date of Patent: Jul. 13, 2004

(54) FOUR COLOR FILM WRITER

(75) Inventors: James E. Roddy, Rochester, NY (US); Robert J. Zolla, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 160 days.

(21) Appl. No.: 10/084,731

(22) Filed: Feb. 26, 2002

(65) Prior Publication Data
US 2003/0160859 A1 Aug. 28, 2003

(51) Int. Cl.[7] ................................................ B41J 2/47
(52) U.S. Cl. ...................................... 347/239; 347/255
(58) Field of Search ............................... 347/238, 239, 347/241, 255, 256, 232; 345/84; 358/75; 430/508

(56) References Cited

U.S. PATENT DOCUMENTS

| | | | |
|---|---|---|---|
| 2,763,549 A | * 9/1956 | Hanson, Jr. | 430/508 |
| 3,761,172 A | 9/1973 | Letzer | 355/35 |
| 4,728,965 A | 3/1988 | Kessler et al. | 347/241 |
| 4,956,702 A | * 9/1990 | McQuade et al. | 358/75 |
| 5,537,258 A | 7/1996 | Yamazaki et al. | 359/634 |
| 5,982,407 A | 11/1999 | Enomoto et al. | 347/239 |
| 6,018,408 A | 1/2000 | Hong | 359/201 |
| 6,133,933 A | * 10/2000 | Paoli | 347/238 |
| 6,159,674 A | 12/2000 | Edwards | 430/543 |
| 6,191,826 B1 | 2/2001 | Murakami et al. | 348/744 |
| 6,197,489 B1 | 3/2001 | Edwards et al. | 430/543 |
| 6,215,547 B1 | 4/2001 | Ramanujan et al. | 355/67 |
| 6,220,710 B1 | 4/2001 | Raj et al. | 353/20 |
| 6,256,073 B1 | 7/2001 | Pettitt | 348/743 |
| 6,414,705 B1 | * 7/2002 | Yamada et al. | 347/232 |
| 2001/0022566 A1 | * 9/2001 | Okazaki | 345/84 |

FOREIGN PATENT DOCUMENTS

| | | |
|---|---|---|
| EP | 843487 A1 | 5/1998 |
| EP | 888016 A1 | 12/1998 |
| EP | 1148736 A2 | 10/2001 |
| WO | 01/95544 A2 | 12/2001 |

* cited by examiner

*Primary Examiner*—Hai Pham
(74) *Attorney, Agent, or Firm*—Nelson Adrian Blish (57) ABSTRACT

A color printer (10) for imaging onto a photosensitive medium (140) that contains four or more layers for providing images having an expanded color gamut. Color printer (10) directs polarized light from each of four or more light sources (12) to a spatial light modulator (20) for forming an image to be printed. Modulated light is conditioned as necessary, then focused through a print lens (110) onto photosensitive medium (140). Light sources 12 can be lasers, LEDs, or other suitable components. Embodiments may use a single spatial light modulator (20) shared with each color path or a spatial light modulator (20) in each of the four color paths.

82 Claims, 7 Drawing Sheets

FOUR COLOR FILM WRITER

CROSS REFERENCE TO RELATED APPLICATIONS

Reference is made to commonly-assigned copending U.S. patent application Ser. No. 10/082,936, filed Feb. 26, 2002, entitled FOUR COLOR IMAGE SENSING APPARATUS, by Roddy et al.; and U.S. patent application Ser. No. 10/067,929, filed Feb. 6, 2002, entitled PRINTING APPARATUS FOR PHOTOSENSITIVE MEDIA USING DICHROIC PRISM IN ILLUMINATION PATH, by Roddy et al., the disclosures of which are incorporated herein.

FIELD OF THE INVENTION

This invention relates to the field of color printers or writers and is specifically concerned with writing digital color images onto motion picture film for theater projection.

BACKGROUND OF THE INVENTION

For quite some time writers have existed that can take electronic/digital image data and use it to expose color motion picture film. The most mature of the technologies, still in use today, uses the color cathode ray tube (CRT). Celco is one of several manufacturers in this field. Another is Management Graphics which makes the Solitaire CRT film writer. The electron beam generated by the CRT strikes the red, green, and blue (RGB) phosphors on the surface of the tube. The phosphors then emit light which is imaged onto the film. The image is written in a raster scan.

Laser writers for film, capable of higher resolution and generally higher speeds than their CRT counterparts, have been in use for a decade. The Kodak Cineon System uses a laser writer with red, green, and blue gas laser sources. The lasers are raster scanned by a rotating polygon mirror onto a moving drum. A more recent introduction, the Arrilaser by Arri, uses a flat platen instead of a drum and a single faceted scanner mirror (monogon). The red, green, and blue lasers use solid state or diode laser technology, but the basic approach is the same. Three primary color sources, red, green, and blue, are used to expose the three emulsion layers (red sensitive, green sensitive, and blue sensitive) to produce three color dye layers in the developed film. Typically, in a color negative media, the dyes are the subtractive color primaries: cyan, magenta, and yellow.

For example, U.S. Pat. No. 6,018,408 discloses a RGB raster scan laser projector using polygon/galvo scanner. A white light laser is separated into RGB components for modulation and projection. Similar devices are designed to demagnify the image for film exposure.

As another example, U.S. Pat. No. 5,537,258 discloses a laser projection system with red, green, and blue dye lasers providing the primary colors for forming an image using a single shared spatial light modulator. In this case, instead of a raster scan, the entire image area is exposed simultaneously, by using an area modulation device.

Figure 1:
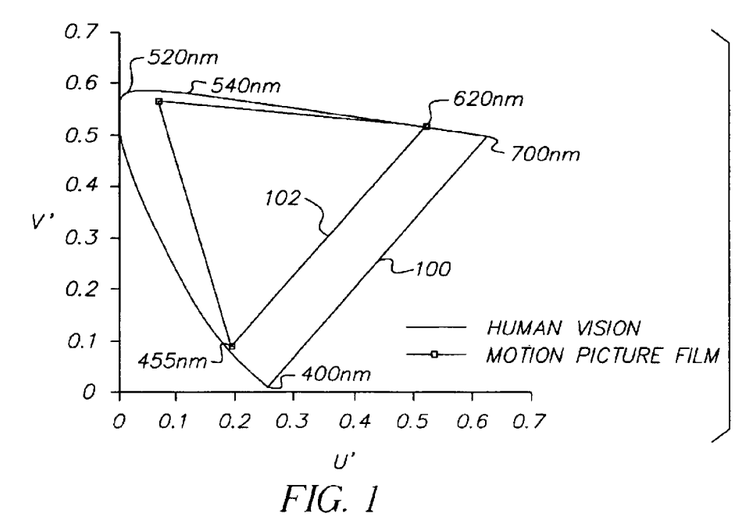
FIG. 1 shows the human visual color perception space in u', v' coordinates based on the CIE convention. Also shown for comparison is the triangular color gamut that can be achieved by conventional motion picture film.

FIG. 1 shows a familiar color gamut representation using CIE 1976 L*u*v* conventions, with the perceived eye-brain color gamut in u'–v' coordinate space represented as a visible gamut 100. Pure, saturated spectral colors are mapped to the "horseshoe" shaped periphery of the visible gamut 100 curve. The interior of the "horseshoe" contains all mappings of mixtures of colors, such as spectral red with added blue, which becomes magenta, for example. The interior of the horseshoe can also contain mixtures of pure colors with white, such as spectral red with added white, which becomes pink, for example. The overall color area defined by the "horseshoe" curve of visible gamut 100 is the full range of color that the human visual system can perceive. It is desirable to represent as much as possible of this area in a color display, to come as close as possible to representing the original scene as we would perceive it if we were actually viewing it.

The gamut available using conventional color motion picture film is shown by a conventional motion picture film gamut triangle 102 in FIG. 1. The approximate wavelengths of vertices of the triangle are shown as red (620 nm), green (540 nm), and blue (455 nm). Any color within the bounds of this triangle can be displayed. Colors lying outside the triangle but within the "horseshoe" curve can be perceived by the human eye but cannot be represented with conventional color film. Such colors are out-of-gamut colors, such as turquoise (blue-green), for example.

Figure 2:
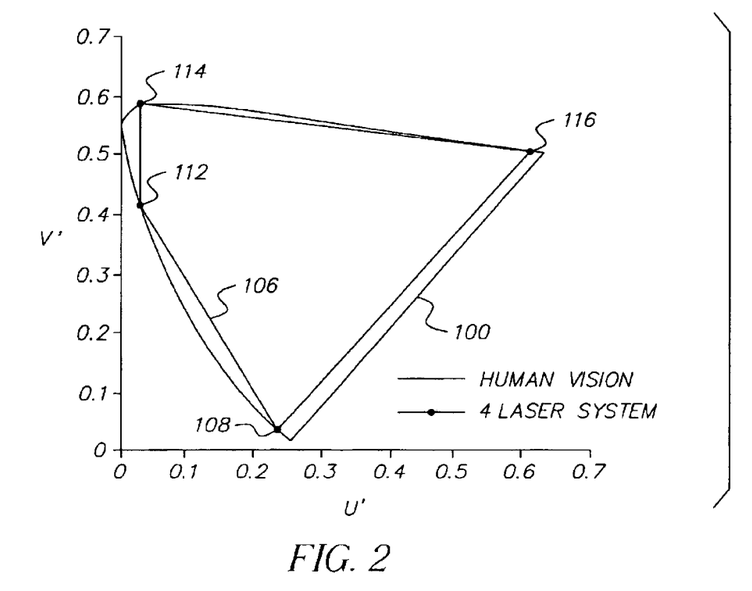
FIG. 2 shows the human visual color gamut along with the extended gamut achieved by a four color laser display.

FIG. 2 shows the same curve 100 with the human eye response, but this time a polygon 106, representing the gamut achievable using a four color laser display is shown. The vertices of gamut polygon 106 are the laser wavelengths: red 116 at 649 nm, green 114 at 514 nm, blue-green 112 at 488 nm, and blue 108 at 442 nm. Lasers, by their very nature, are monochromatic, providing fully saturated colors, unlike most light sources. Saturated colors lie on the periphery of the "horseshoe" curve. The resulting four laser gamut covers virtually the whole range of visual color space. Clearly, the introduction of a fourth color into this display provides a considerable gamut increase over that of conventional motion picture film as shown in FIG. 1.

With respect to digital projection apparatus, there have been some attempts to expand from the conventional three-color model in order to represent color in a more accurate, more pleasing manner. Notably, few of these attempts are directed to expanding the color gamut. For example, U.S. Pat. No. 6,256,073 (Pettit) discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is an "intra-gamut" color addition; in terms of color theory, adding white actually reduces the color gamut by desaturating the color. Similarly, U.S. Pat. No. 6,220,710 (Raj et al.) discloses the addition of a white light channel to standard R, G, B light channels in a projection apparatus. As was just noted, the addition of white light may provide added luminosity, but constricts the color gamut.

U.S. Pat. No. 6,191,826 (Murakami et al.) discloses a projector apparatus that uses four colors derived from a single white light source, where the addition of a fourth color, orange, compensates for unwanted effects of spectral distribution that affect the primary green color path. Again, the approach disclosed in the Murakami patent does not expand color gamut and may actually reduce the gamut.

Patent Application WO 01/95544 A2 (Ben-David et al.) discloses a display device and method for color gamut expansion using four or more primary colors. However, the approach disclosed in WO 01/95544 is directed to apparatus for projection of digital images, but does not provide a suitable solution for imaging onto a photosensitive medium. It must be emphasized that there are significant differences between display and printing of digital color images. For example, image brightness, which must be optimized in a display system, is not a concern in printing apparatus design.

Resolution, on the other hand, while not as important for images displayed on-screen, is very important for images printed on film or paper. Timing requirements are not as demanding for color printing, since successive exposures can be used for successive layers of a photosensitive medium. Notably, the apparatus disclosed in WO 01/95544 forms an image by projecting four colors, but uses three-color RGB data as input for computing a four-color value. It can be appreciated that there would be advantages in obtaining and processing four-color data throughout the imaging process, rather than using interpolation algorithms to compute a fourth color coordinate from three-color data.

It would be advantageous to have a color film equivalent to the extended gamut of a four laser display as represented in FIG. 2. Digital cinema, now in its infancy, can take immediate advantage of this increased gamut to enhance the theatrical experience of the movie audience. Although digital projection may gradually replace many of the 35 mm film projectors in existence today, it would be economically advantageous for filmmakers to have the capability to have their movies shown on film projectors as well as on digital cinema projectors, and NTSC and HDTV television. However, merely exposing a conventional color film to these four laser sources would not change the gamut available beyond that of FIG. 1.

SUMMARY OF THE INVENTION

An object of the present invention is to provide a color printer for photosensitive media that provides four different color light sources to print on photosensitive media that has four separate spectral sensitivities depositing four dyes upon processing to expand the color gamut of the resultant image.

Briefly, according to one aspect of the present invention a color printer for printing to a photosensitive medium comprises a first light source for generating a first color beam and a first modulator for modulating the first color beam. A second light source for generating a second color beam and a second modulator for modulating the second color beam. A third light source for generating a third color beam and a third modulator for modulating the third color beam. A fourth light source for generating a fourth color beam and a fourth modulator for modulating the fourth color beam. An optical system combines and images the modulated beams onto the photosensitive medium.

It is an advantage of one embodiment of the invention to provide a compact unit for high speed writing, having four light sources and four modulators in a single plane.

It is an advantage of another embodiment to provide to provide a simple printer that combines four light sources and a single modulator in a single optical path to provide sequential exposure.

It is an advantage of another embodiment to provide a compact sequential writer that uses an x-cube to combine four light sources.

It is an advantage of yet another embodiment to provide a writer with high optical efficiency by utilizing four polarized lasers as light sources.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

It has been shown that the color gamut of conventional film is limited to a triangular region by the three dyes that are formed in the three color sensitive layers during the process of color development of the photographic film. Simply exposing conventional color film to four light sources (red, green, blue and a fourth color, such as blue-green or yellow, for example) will not extend the color gamut. What is required is a fourth color sensitive layer that forms a fourth dye upon processing.

Figure 3:
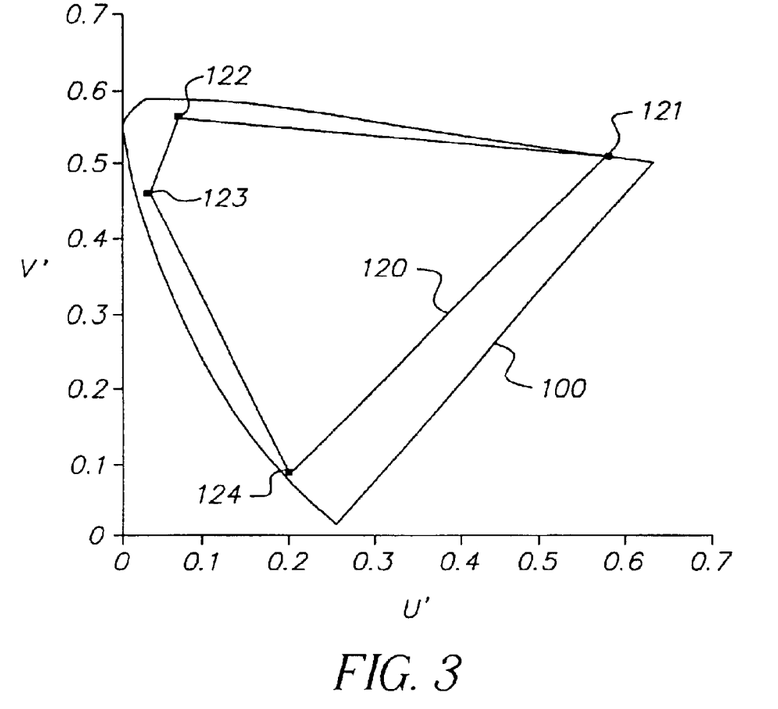
FIG. 3 shows the human visual gamut along with the extended gamut that can be achieved by a color film with four sensitive layers.

Comparing FIGS. 1 and 2, one obvious choice for the color of the fourth dye is in the blue-green region of the spectrum around 490 nm in order to achieve the largest possible polygon area and color gamut. Such a film gamut 120 is shown in FIG. 3. The red 121, green 122 and blue 124 vertices are the same as FIG. 1, assuming that the original dyes are unchanged. The blue and the red dyes could be modified also to achieve an even greater gamut. The new blue-green vertex 123 is located near 490 nm. It should be understood that the dyes formed are not quite as saturated as laser sources, such that the vertices are near, but not on, the periphery of the "horseshoe" curve of visible gamut 100 that defines human vision. Nonetheless, a substantial improvement in gamut is achieved.

It is not necessary to design both a negative and a print film with four color capability. A single reversal film, basically a slide film, can suffice. The productivity burden is then placed on the four source writer that exposes this film. The color gamut of the resultant image is determined by the dyes in the processed film, not by the exposure sources. Therefore, LEDs or filtered tungsten lamps could be used in place of lasers as exposure sources, taking care to avoid printup/punchthrough of an adjacent color. In addition, the light color used for film exposure need not be the color in the original scene or the color of the dye deposited in processing. For example, blue-green dye could be deposited by infrared exposure, where the fourth layer is infra-red sensitive.

The Fuji Photo Film Co. Ltd., of Tokyo, Japan offers several color negative films with four color sensitive layers. The outermost is a blue sensitive layer, then a green sensitive layer, then a cyan (blue-green) sensitive layer, then a red sensitive layer. When processed, these layers form the complementary or subtractive primary dyes. Uppermost is the yellow negative image, then a magenta negative image, then a light-magenta negative image, and finally a cyan negative image. Interimage effects on the red sensitive layer from the light-magenta image formed by the cyan sensitive layer are used to approximate the red negative lobe of the eye color matching function. This results in a film system that more closely matches the human eye's response to color, but does nothing to increase the gamut of colors reproducible by the system.

U.S. Pat. Nos. 6,159,674 and 6,197,489 describe in detail the construction of a film with four sensitive layers. U.S. Pat. No. 6,159,674 discloses a film with an red dye forming layer in addition to the standard cyan, magenta, and yellow dye forming layers, while U.S. Pat. No. 6,197,489 discloses a film with a blue dye forming layer in addition to the standard cyan, magenta and yellow dye forming layers. U.S. Pat. No. 6,197,489 does mention that it could be used with a digital printer that has four light sources to improve color gamut. The gamut extension noted is in the blue or red region, however, not in the blue-green region. Extension to both the red and blue regions may best be accomplished with a three dye system where the center wavelengths of the red and blue dyes are positioned farther out on the visual curve toward the red and blue extremities. In any case, films with an additional color sensitive layer forming an additional dye image are indeed possible.

U.S. Pat. No. 6,215,547 discloses an RGB printer based on red, green, and blue LED sources that prints on photographic paper and film. U.S. Pat. No. 5,982,407 discloses a photographic printer that uses red, green, and blue LED sources and also allows for a white LED to expose monochromatic images onto color film.

The flying spot laser raster scan approach to digital printing is disclosed in U.S. Pat. No. 4,728,965. The laser is usually sequentially modulated on a pixel by pixel basis by an acousto-optic modulator. The high-speed horizontal scan is accomplished by a polygon or hologon scanner. The slower speed vertical scan is generally accomplished by a precision film transport or by a galvanometer driven mirror.

Figure 4:
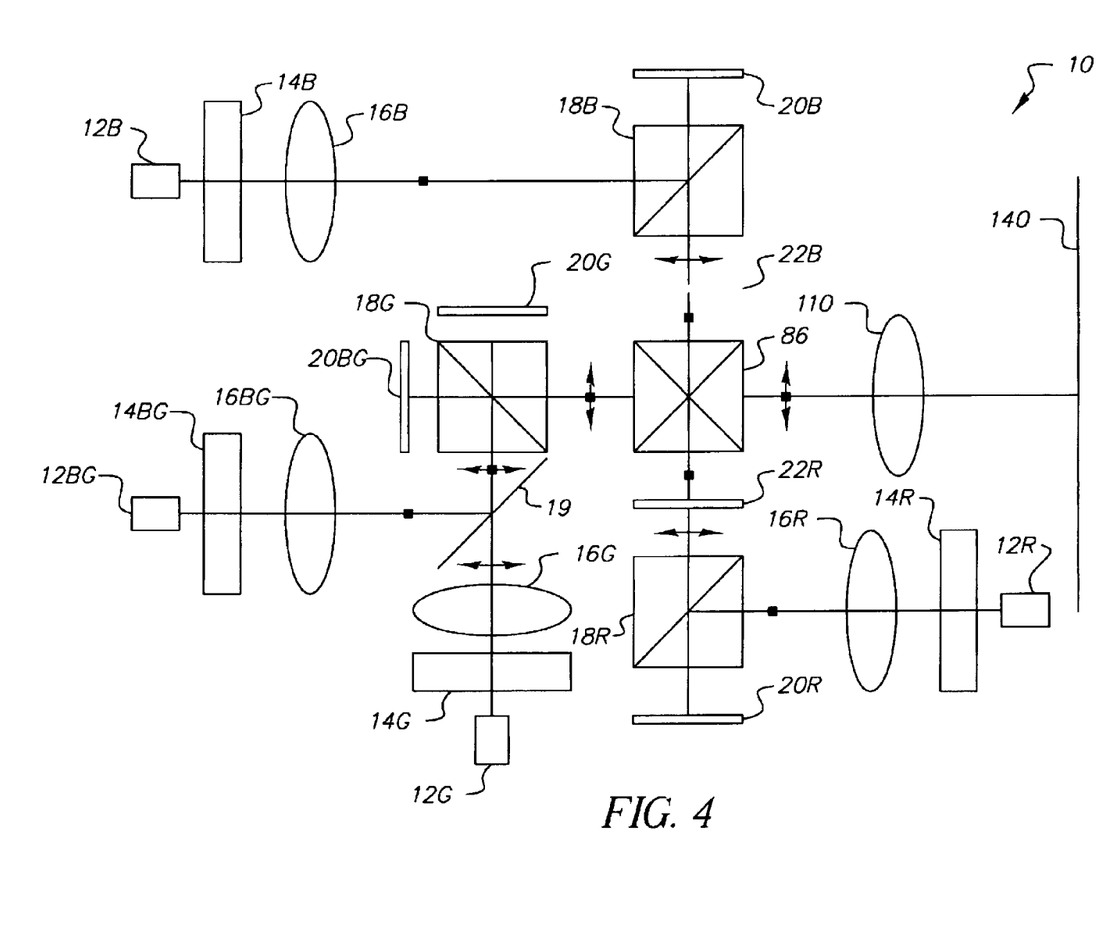
FIG. 4 is a schematic view of a four color simultaneous writer optical system with four light sources (red, green, blue-green, and blue) and four spatial light modulators.

FIG. 4 shows a color printer 10 designed to write on an extended gamut photosensitive media with four color sensitive layers. The printer has four sources, shown here as red 12R, green 12G, blue-green 12BG, and blue 12B. These would typically be lasers or LEDs but could be filtered white light sources also or any combination of sources. Following the blue channel, the beam from the source 12B passes through a uniformizer 14B, which can be an integrator bar or a lenslet array. A condenser lens 16B images the uniformized light beam through a polarization beamsplitter 18B onto the spatial light modulator 20B, shown here as a reflective LCD device. The light must be polarized for the LCD to work properly. The plane of polarization is out of the plane of the paper as indicated by the dot before the polarization beamsplitter prism 18B.

The LCD modulator has a large number of pixel sites which are electrically addressed by the blue image data (not shown). Depending upon the amount of voltage applied to a given pixel, the plane of polarization of the light from that pixel is rotated such that part or all of it is horizontal and lies in the plane of the paper as indicated by the arrow after the prism.

The image modulated beam then passes through a half wave plate 22B which rotates the plane of polarization back to vertical (out of the plane of the paper) so that it will be reflected by an x-cube 86 and be imaged by a print lens 110 onto a photosensitive medium 140. The red channel is handled in an identical manner. The green 12G and blue-green 12BG channels are shown to have opposite polarizations and are combined by a dichroic mirror 19 before entering a polarization beamsplitter 18G. This design takes advantage of the fact that x-cube 86 will pass light of either polarization only in this particular direction. The uniformized beam of the appropriate color strikes the appropriate modulator 20G or 20BG and the image modulated beam is sent to x-cube 86. The coatings of a standard x-cube may have to be adjusted slightly so that x-cube 86 passes both blue-green and green in this direction. Both the blue-green and green light pass through x-cube 86 and are imaged by print lens 110 onto photosensitive medium 140.

This design allows a compact arrangement of all the optical components in a single plane and allows all four colors to be exposed simultaneously. It is possible to have both G and BG sources with S-polarization, allowing an analyzer to improve contrast, but this approach is likely to require a custom x-cube coating. Light sources 12R, 12B, 12G, and 12BG can be LED arrays, lasers, filtered white light sources, or any combination. It should be noted that the color of the exposing light source 12 need not be the same as the color of the dye deposited in film processing. For example, the blue-green dye could be deposited as a result of exposure of that photosensitive layer to a source of infra-red or ultra-violet light. The chemical couplers determine which dye gets deposited. The sensitivity of the film layer has to be responsive to the wavelength of the intended source. Likewise, blue dye could be deposited as a result of exposure to ultra-violet light. The term "light", as used here, can refer to any portion of the electromagnetic spectrum, and not just the visible region. X-ray sources could also be included. (In fact, the exposure of photographic film led to the discovery of x-rays.) Moreover, although blue-green is used in the preferred embodiment, some other primary color in the visible spectrum could alternately be used.

Figure 5:
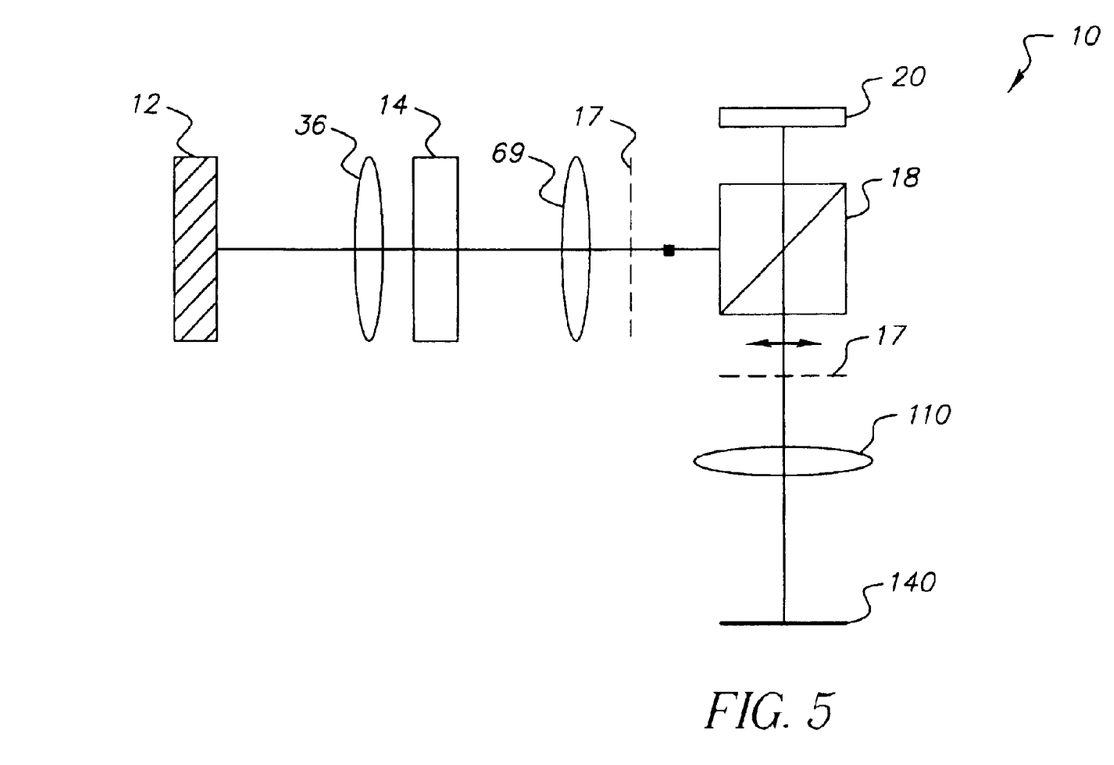
FIG. 5 is a schematic view of a four color sequential writer optical system which uses a multicolor LED array source and a single spatial light modulator.

FIG. 5 is another embodiment of color printer 10 where a single spatial light modulator 20 is used. The use of a single spatial light modulator 20 reduces the cost, complexity, and alignment requirements of the writer. Image data is input to modulator 20 sequentially, color by color. The appropriate color light source 12 is turned on while image data of that color is present on modulator 20. In a preferred embodiment, a single multicolor LED array is used as light source 12 where the number of LEDs used for a given color in inversely proportional to film sensitivity. The light is collected by a field lens 15 and uniformized by uniformizing optics 14 such as a lenslet array or integrator bar. Condenser lens 16 images the uniformized light onto spatial light modulator 20. The light first passes through a polarizer 17 and polarization beamsplitter prism 18. The uniform light is modulated by spatial light modulator 20 and the modulated image light, now horizontally polarized as shown by the arrow, is imaged onto photosensitive medium 140 by print lens 110. A second polarizer 17 can be used to improve contrast. Light source 12 could also be a multicolored laser and polarizing beamsplitter 18 could be a wire grid device rather than a prism. Polarizers 17 could be sheet plastic or could also be wire grid devices. The advantages of a single spatial light modulator (SLM) 20 are lower cost, reduced complexity, and ease of alignment. The four colors do not have to be registered to each other. This function is accomplished automatically because the same modulator 20 device is used for all colors. The colors are exposed sequentially and the setup parameters for modulator 20 may need to be changed for each color. Since the exposures are sequential and all four color sources must fit in a single array, more time is required to write each image than with the simultaneous writer of FIG. 4.

Figure 6:
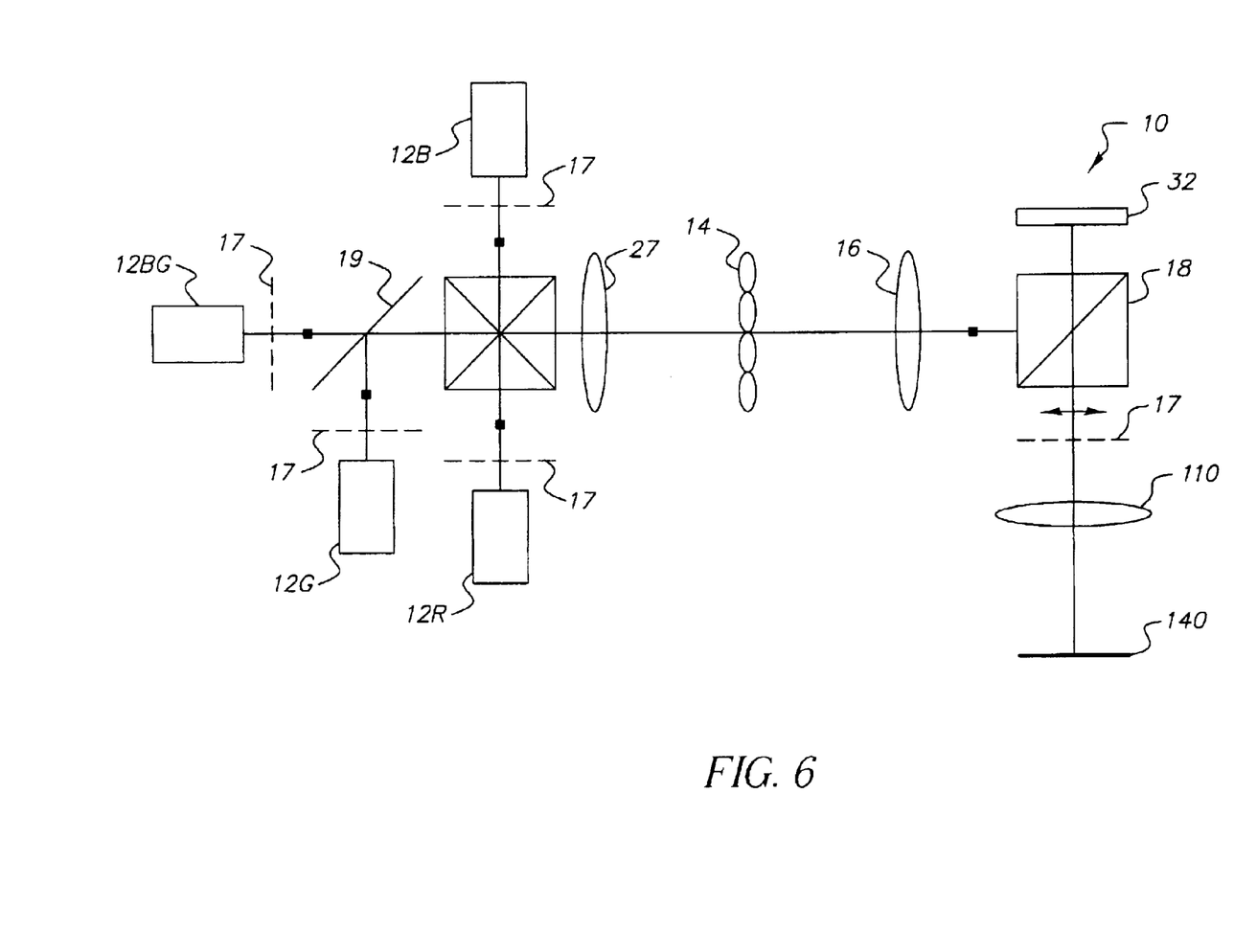
FIG. 6 is a schematic view of a four color sequential writer optical system which uses four single-color sources, combined through a dichroic prism, and a single spatial light modulator.

FIG. 6 is very similar to the writer of FIG. 5, using four separate light sources combined through x-cube 86 to allow faster writing speeds. The four light sources 12R, 12G, 12BG, and 12B must be polarized. Polarizers 17 are shown, assuming the sources are unpolarized LEDs. Green and blue green sources 12G and 12BG are combined through a dichroic mirror 19 and then enter x-cube 86. Lens 15 collects the light and the beams pass through a collimator lens 36 and a uniformizing optics 14, a lenslet array in the preferred embodiment. The uniformized light is imaged onto spatial light modulator 20 by condenser lens 16, through polarization beamsplitter prism 18. The image modulated light passes through prism 18 and is imaged onto photosensitive medium 140 by print lens 110. A second polarizer 17 can be located before print lens 110 to improve contrast. Note that the fourth light source 12 is shown as a blue-green LED array to deposit blue-green dye in the output film. It could just as well be an infra-red source if the fourth film layer is designed for infra-red sensitivity and deposits blue-green dye, as noted previously.

Figure 7:
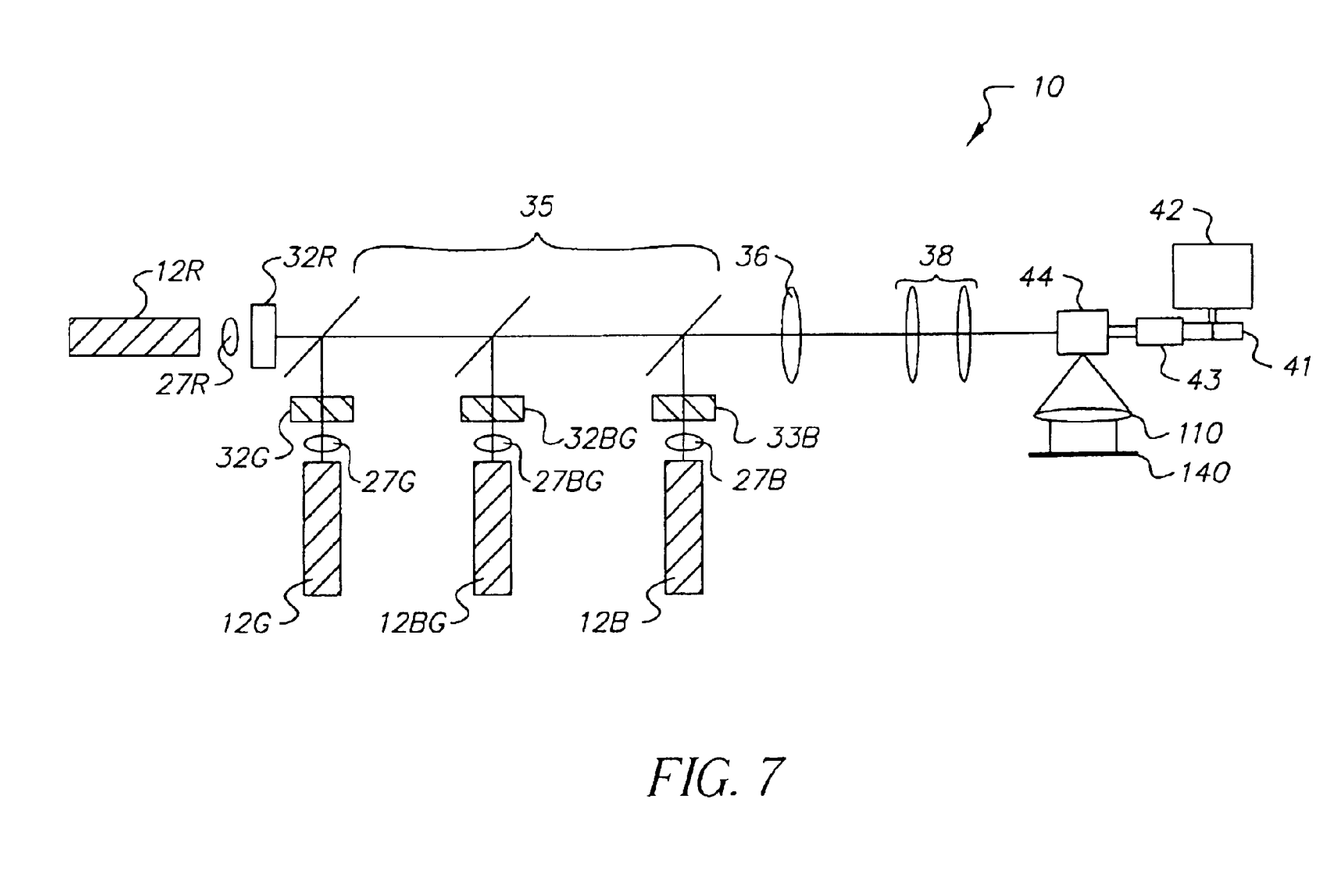
FIG. 7 is a schematic view of a four color simultaneous writer optical system with four independently modulated laser sources (red, green, blue-green, and blue) and a raster scan polygon-galvo mirror deflection system.

FIG. 7 is yet another embodiment of color printer 10 using four colors, but this time using a raster scan method rather than an area array modulator. The four light sources 12 are typically lasers: a red laser 12R, a green laser 12G, a blue-green laser 12BG, a the blue laser 12B. All color channels are handled similarly. Following the red channel, the beam is focused into a light modulator 32R, typically an acousto-optic modulator, by a lens 27R. The pixel information for the red image is sent on a pixel by pixel basis to modulator 32R, which can also function as a shutter. Lens 27 and the following lens 36, form a beam expander. The red beam passes through a dichroic beam combiner 35, which allows all four color beams to be collinear. The beam passes through the beam shaping optics 38 and strikes a rotating polygon mirror 41 driven by a motor 42. Rotating polygon mirror 41 provides the high speed horizontal scan. The slower speed vertical scan is provided by a galvanometer driven mirror 43 controlled by a galvanometer actuator 44. The scanning beam is then focused to a scanning spot onto photosensitive medium 140 by print lens 110. The other color channels are handled in a similar manner. Instead of being transmitted by all the dichroic mirrors in combiner 35, they are reflected off the appropriate mirror and are transmitted by the remainder. All four colors are imaged simultaneously. The timing, drive, and datapath electronics are not shown but are well known in the art of three color RGB writers.

Figure 8:
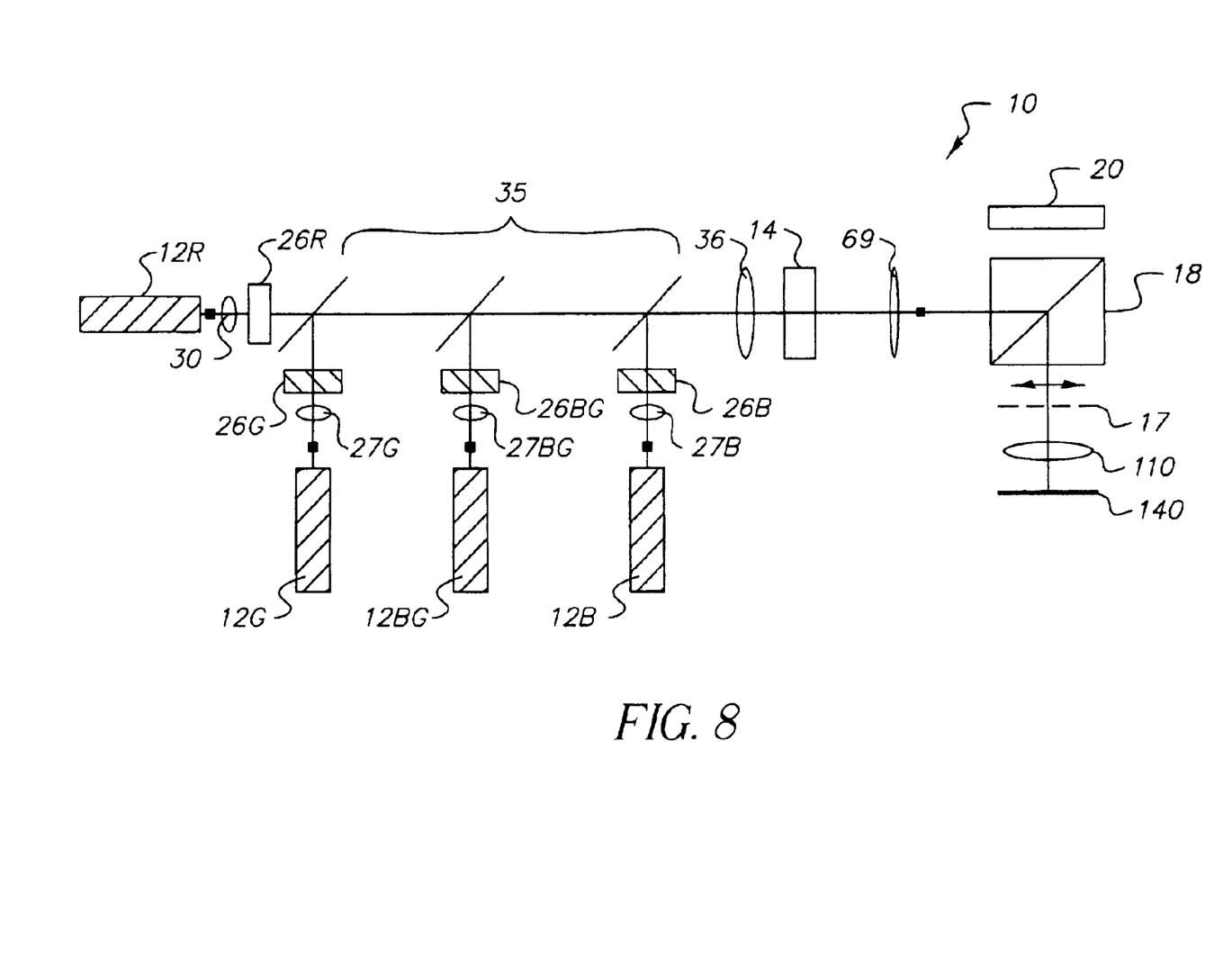
FIG. 8 is a schematic view of a four color sequential writer optical system with four laser sources (red, green, blue-green, and blue) and a single spatial light modulator.

FIG. 8 shows color printer 10 as a four laser writer that uses a single spatial light modulator 20 for sequential exposure of color images. The four light sources 12 are typically polarized lasers: the red laser 12R, the green laser 12G, the blue-green laser 12BG, and the blue laser 12B. All color channels are handled similarly. Following the red channel, the beam is focused into a shutter 26R, which could be an acousto-optic modulator, by a lens 27R. This lens and the following lens 36, form a beam expander. The red beam passes through the dichroic beam combiner 35, which allows all four color beams to be collinear. Uniformizer 14 can be a lenslet array or integrator bar. Condenser lens 69 images the uniform light onto spatial light modulator 20 via polarization beamsplitter prism 18. The input laser light should be plane polarized, perpendicular to the plane of the paper as shown by the dot. Because the lasers are already plane polarized, the light loss (typically 60%) of placing an input polarizer in the beam is avoided. The pixel information for the red image is sent to modulator 20. Modulator 20 rotates the plane of polarization of the light on a pixel by pixel basis. The rotated, or image-containing component of the light is polarized parallel to the plane of the paper, as shown by the arrow. This light is imaged onto photosensitive medium 140 by print lens 110. Polarizer 17 is used to improve the contrast ratio of the image.

It should be noted that many variations of the above designs are possible by one skilled in the art. For instance, one of light sources 12 could be a filtered tungsten lamp or a filtered xenon lamp. The wavelengths used for light sources 12 could be selected appropriately to optimize response of photosensitive medium 140. LEDs and lasers can be interchanged with appropriate optical modifications. Wire grid devices can used for polarizers 17 and in place of polarization beamsplitting prism 18. Digital micromirror devices (DMDs), transmissive LCDs, gated light valves, acousto-optical devices, or electro-optic modulators combined with polygon scanners, could alternately be used for spatial light modulators 20, with corresponding changes to support illumination and beam conditioning optics, as is well known in the optical arts. Acousto-optic modulators can be replaced with electro-optic modulators. Uniformizers 14 can be optical mirror tunnels as well as integrator bars and lenslet arrays.

In a preferred embodiment, photosensitive medium 140 is a motion picture film. However, photosensitive medium 140 could alternately be some other type of medium having four sensitive color layers, such as a motion picture negative film, a motion picture print film, a motion picture reversal film, a photographic film, a photographic negative film, a photographic print film, a photographic reversal film, or a photographic paper, for example. The design of photosensitive medium 140 need not be limited to four sensitive layers. Sensitivities to additional colors can be added to expand the gamut. The sensitivity of any of the film layers need not be to the same color of light as the color of the dye that gets deposited in processing, because this is not a camera negative. The "blue-green" layer could be sensitive to infra-red light, as previously noted. For that matter, the "red" layer could be sensitive to infra-red light and the "blue-green" layer might be made sensitive to red light or even UV light. The sensitivities can be chosen to optimize film performance or can be based on availability of light sources. The color printer 10 is then designed based on the film sensitivity, not on the color of the dye in the processed output film.

The invention has been described in detail with particular reference to certain preferred embodiments thereof, but it will be understood that variations and modifications can be effected within the scope of the invention.

PARTS LIST

| | PARTS LIST |
|---|---|
| 10. | Color printer |
| 12. | Light source |
| 12R. | Red light source |
| 12G. | Green light source |
| 12B. | Blue light source |
| 12BG. | Blue-green light source |
| 14. | Uniformizing optics |
| 14R. | Uniformizing optics, red light path |
| 14G. | Uniformizing optics, green light path |
| 14B. | Uniformizing optics, blue light path |
| 14BG. | Uniformizing optics, blue-green light path |
| 15. | Field lens |
| 16. | Condenser lens |
| 16R. | Condenser lens, red light path |
| 16G. | Condenser lens, green light path |
| 16B. | Condenser lens, blue light path |
| 16BG. | Condenser lens, blue-green light path |
| 17. | Polarizer |
| 18. | Polarizing beamsplitter |
| 18R. | Polarizing beamsplitter, red light path |
| 18G. | Polarizing beamsplitter, green and blue-green light path |
| 18B. | Polarizing beamsplitter, blue light path; |
| 19. | Dichroic mirror |
| 20. | Spatial light modulator |
| 20R. | Spatial light modulator, red light path |
| 20G. | Spatial light modulator, green light path |
| 20B. | Spatial light modulator, blue light path |
| 20BG. | Spatial light modulator, blue-green light path |
| 22. | Half waveplate |
| 22R. | Half waveplate, red light path |
| 22B. | Half waveplate, blue light path |
| 26. | Shutter |
| 26R. | Shutter, red light path |
| 26G. | Shutter, green light path |
| 26B. | Shutter, blue light path |
| 26BG. | Shutter, blue-green light path |
| 27. | Lens |
| 27R. | Lens, red light path |
| 27G. | Lens, green light path |
| 27B. | Lens, blue light path |
| 27BG. | Lens, blue-green light path |
| 32. | Pixel sequential light modulator (AOM) |
| 32R. | Modulator, red light path |
| 32G. | Modulator, green light path |
| 32B. | Modulator, blue light path |
| 32BG. | Modulator, blue-green light path; |
| 35. | Dichroic combiner |
| 36. | Collimator lens |
| 38. | Beam-shaping optics |
| 41. | Polygon mirror |
| 42. | Motor |
| 43. | Galvanometer-driven mirror |
| 44. | Galvanometer actuator |
| 69. | Condenser lens |
| 86. | X-cube |
| 100. | Visible gamut |
| 102. | Conventional motion picture film gamut |
| 106. | Four-source gamut |
| 108. | Polygon vertices for laser sources |
| 112. | Polygon vertices for laser sources |
| 114. | Polygon vertices for laser sources |
| 116. | Polygon vertices for laser sources |
| 110. | Print lens |
| 120. | Extended gamut polygon of four color film |
| 121. | Red vertex near 620 nm |
| 122. | Green vertex near 540 nm |
| 123. | Blue-green vertex near 490 nm |
| 124. | Blue vertex near 455 nm |
| 140. | Photosensitive medium |

What is claimed is:

1. A color printer for printing to a photosensitive medium comprising:
   a first light source for generating a first color beam;
   a first modulator for modulating said first color beam;
   a second light source for generating a second a color beam;
   a second modulator for modulating said second color beam;
   a third light source for generating a third color beam;
   a third modulator for modulating said third color beam;
   at least a fourth light source for generating a fourth color beam;
   a fourth modulator for modulating at least said fourth color beam;
   wherein a polarization of said fourth modulated beam is orthogonal to a polarization of said third modulated beam; and
   an optical system for combining and imaging said modulated beams onto said photosensitive medium.

2. A color printer as in claim 1 wherein said photosensitive medium is a motion picture film having at least four sensitive layers.

3. A color printer as in claim 1 wherein said photosensitive medium is a motion picture negative film having at least four sensitive layers.

4. A color printer as in claim 1 wherein said photosensitive medium is a motion picture print film having at least four sensitive layers.

5. A color printer as in claim 1 wherein said photosensitive medium is a motion picture reversal film having at least four sensitive layers.

6. A color printer as in claim 1 wherein said photosensitive medium is a photographic film having at least four sensitive layers.

7. A color printer as in claim 1 wherein said photosensitive medium is a photographic negative film having at least four sensitive layers.

8. A color printer as in claim 1 wherein said photosensitive medium is a photographic print film having at least four sensitive layers.

9. A color printer as in claim 1 wherein said photosensitive medium is a photographic reversal film having at least four sensitive layers.

10. A color printer as in claim 1 wherein said photosensitive medium is a photographic paper having at least four sensitive layers.

11. A color printer as in claim 1 wherein said modulators are reflective liquid crystal devices (LCDs).

12. A color printer as in claim 1 wherein said modulators are transmissive liquid crystal devices (LCDs).

13. A color printer as in claim 1 wherein said modulators are digital micromirror devices.

14. A color printer as in claim 1 wherein said modulators are gated light valves.

15. A color printer as in claim 1 wherein said modulators are acousto-optic.

16. A color printer as in claim 1 wherein said modulators are comprised of electro-optic modulators.

17. A color printer as in claim 1 wherein said light sources are selected from a group comprised of infra-red, red, green, yellow-green, blue-green, blue, and ultra-violet lasers.

18. A color printer as in claim 1 wherein said light sources are selected from a group comprised of infra-red LED array, red LED array, green LED array, blue-green LED array, yellow-green LED array, a blue LED array, and an ultra-violet LED array.

19. A color printer as in claim 1 wherein each of said light sources are comprised of an array of light sources, wherein light sources in each array are selected from a group comprised of infra-red LED, red LED, green LED, blue-green LED, yellow-green LED, blue LED, and ultra-violet LED.

20. A color printer as in claim 1 wherein said light sources are selected from a group comprised of laser, LED array, filtered xenon, and filtered tungsten.

21. A color printer as in claim 1 wherein said optical system comprises an x-cube.

22. A method of printing to a photosensitive medium comprising:
   generating a first color beam;
   modulating said first color beam;
   generating a second color beam;
   modulating said second color beam;
   generating a third color beam;
   modulating said third color beam;
   generating at least a fourth color beam;
   modulating at least said fourth color beam;
   wherein said third modulated color beam and said fourth modulated color beam are orthogonally polarized; and
   combining and imaging said modulated beams onto said photosensitive medium.

23. A method as in claim 22 wherein said photosensitive medium is a motion picture film having at least four sensitive layers.

24. A method as in claim 22 wherein said photosensitive medium is a motion picture negative film having at least four sensitive layers.

25. A method as in claim 22 wherein said photosensitive medium is a motion picture print film having at least four sensitive layers.

26. A method as in claim 22 wherein said photosensitive medium is a motion picture reversal film having at least four sensitive layers.

27. A method as in claim 22 wherein said photosensitive medium is a photographic film having at least four sensitive layers.

28. A method as in claim 22 wherein said photosensitive medium is a photographic negative film having at least four sensitive layers.

29. A method as in claim 22 wherein said photosensitive photographic print film having at least four sensitive layers.

30. A method as in claim 22 wherein said photosensitive photographic reversal film having at least four sensitive layers.

31. A method as in claim 22 wherein said photosensitive medium is a photographic paper having at least four sensitive layers.

32. A method as in claim 22 wherein said modulators are reflective LCDs.

33. A method as in claim 22 wherein said modulators are transmissive LCDs.

34. A method as in claim 22 wherein said modulators are digital micromirror devices.

35. A method as in claim 22 wherein said modulators are gated light valves.

36. A method as in claim 22 wherein said modulators are acousto-optic.

37. A method as in claim 22 wherein said modulators are electro-optic modulators, wherein combined light beams from said modulators are deflected by polygon scanners.

38. A method as in claim 22 wherein at least one light source is selected from a group comprised of infra-red, red, green, yellow-green, blue-green, blue, and ultra-violet lasers.

39. A method as in claim 22 wherein said light sources are selected from a group comprised of infra-red LED array, red LED array, green LED array, blue-green LED array, yellow-green LED array, blue LED array, and an ultra-violet LED array.

40. A method as in claim 22 wherein each of said light sources are comprised of an array of infra-red LEDs or red LEDs or green LEDs or blue-green LEDs or yellow-green LEDs or blue LEDs or ultra-violet LEDs.

41. A method as in claim 22 wherein said light sources are selected from a group comprised of laser, LED array, filtered xenon, and filtered tungsten.

42. A color printer for printing to a photosensitive medium comprising:
   a first light source for generating a first color beam;
   a first modulator means for modulating said first color beam;
   a second light source for generating a second a color beam;
   a second modulator means for modulating said second color beam;
   a third light source for generating a third color beam;
   a third modulator means for modulating said third color beam;
   at least a fourth light source for generating a fourth color beam;
   a fourth modulator means for modulating at least said fourth color beam;
   wherein said third modulated color beam and said fourth modulated color beam are orthogonally polarized; and
   an optical system for combining and imaging said modulated beams onto said photosensitive medium.

43. A color printer as in claim 42 wherein said photosensitive medium is a motion picture film having at least four sensitive layers.

44. A color printer as in claim 42 wherein said photosensitive medium is a motion picture negative film having at least four sensitive layers.

45. A color printer as in claim 42 wherein said photosensitive medium is a motion picture print film having at least four sensitive layers.

46. A color printer as in claim 42 wherein said photosensitive medium is a motion picture reversal film having at least four sensitive layers.

47. A color printer as in claim 42 wherein said photosensitive medium is a photographic film having at least four sensitive layers.

48. A color printer as in claim 42 wherein said photosensitive medium is a photographic negative film having at least four sensitive layers.

49. A color printer as in claim 42 wherein said photosensitive photographic print film having at least four sensitive layers.

50. A color printer as in claim 42 wherein said photosensitive photographic reversal film having at least four sensitive layers.

51. A color printer as in claim 42 wherein said photosensitive medium is a photographic paper having at least four sensitive layers.

52. A color printer as in claim 42 wherein said modulators are reflective LCDs.

53. A color printer as in claim 42 wherein said modulators are transmissive LCDs.

54. A color printer as in claim 42 wherein said modulators are digital micromirror devices.

55. A color printer as in claim 42 wherein said modulators are gated light valves.

56. A color printer as in claim 42 wherein said modulators are acousto-optic.

57. A color printer as in claim 42 wherein said modulators are electro-optic modulators combined with polygon scanners.

58. A color printer as in claim 42 wherein said light sources are selected from a group comprised of infra-red, red, green, yellow-green, blue-green, blue, and ultra-violet lasers.

59. A color printer as in claim 42 wherein said light sources are selected from a group comprised of infra-red LED array, red LED array, green LED array, blue-green LED array, yellow-green LED array, blue LED array, and an ultra-violet LED array.

60. A color printer as in claim 42 wherein each of said light sources are comprised of an array of infra-red LEDs or red LEDs or green LEDs or blue-green LEDs or yellow-green LEDs or blue LEDs or ultra-violet LEDs.

61. A color printer as in claim 42 wherein said light sources are selected from a group comprised of laser, LED array, filtered xenon, and filtered tungsten.

62. A color printer for printing to a photosensitive medium comprising:
- a plurality first light sources for generating a first color beam;
- a plurality second light sources for generating a second a color beam;
- a plurality third light sources for generating a third color beam;
- at least a fourth light source for generating a fourth color beam;
- wherein said first, second, third, and fourth light sources are arranged as an array of light sources;
- wherein a number of light sources for each color is inversely proportional to a film sensitivity;
- a modulator for modulating said first, second, third, and fourth color beams; and
- an optical system for combining and imaging said modulated beams onto said photosensitive medium.

63. A color printer as in claim 62 wherein said photosensitive medium is a motion picture film having at least four sensitive layers.

64. A color printer as in claim 62 wherein said photosensitive medium is a motion picture negative film having at least four sensitive layers.

65. A color printer as in claim 62 wherein said photosensitive medium is a motion picture print film having at least four sensitive layers.

66. A color printer as in claim 62 wherein said photosensitive medium is a motion picture reversal film having at least four sensitive layers.

67. A color printer as in claim 62 wherein said photosensitive medium is a photographic film having at least four sensitive layers.

68. A color printer as in claim 62 wherein said photosensitive medium is a photographic negative film having at least four sensitive layers.

69. A color printer as in claim 62 wherein said photosensitive medium is a photographic print film having at least four sensitive layers.

70. A color printer as in claim 62 wherein said photosensitive medium is a photographic reversal film having at least four sensitive layers.

71. A color printer as in claim 62 wherein said photosensitive medium is a photographic paper having at least four sensitive layers.

72. A color printer as in claim 62 wherein said modulator is a reflective LCD.

73. A color printer as in claim 62 wherein said modulator is a transmissive LCD.

74. A color printer as in claim 62 wherein said modulator is a digital micromirror device.

75. A color printer as in claim 62 wherein said modulator is a gated light valve.

76. A color printer as in claim 62 wherein said modulator is an acousto-optic.

77. A color printer as in claim 62 wherein said modulator is an electro-optic modulator.

78. A color printer as in claim 62 wherein said light sources are selected from a group comprised of infra-red, red, green, yellow-green, blue-green, blue and ultra-violet lasers.

79. A color printer as in claim 62 wherein said light sources are selected from a group comprised of infra-red LED array, red LED array, green LED array, blue-green LED array, yellow-green LED array, a blue LED array, and an ultra-violet LED array.

80. A color printer as in claim 62 wherein at least one of said light sources is selected from a group comprised of infra-red LED, red LED, green LED, blue-green LED, yellow-green LED, a blue, and an ultra-violet LED.

81. A color printer as in claim 62 wherein said light sources are selected from a group comprised of laser, LED array, filtered xenon, and filtered tungsten.

82. A color printer as in claim 62 wherein said optical system includes at least one raster scanning device selected from a group comprising:
- a polygon, a hologon, or a galvanometer.

* * * * *